United States Patent [19]

Salensky et al.

[11] Patent Number: 4,544,688
[45] Date of Patent: Oct. 1, 1985

[54] METAL-CONTAINING PHENOLIC COATING COMPOSITIONS

[75] Inventors: George A. Salensky, Whitehouse Station; John S. Fry, Hillsborough Township, Somerset County, both of N.J.

[73] Assignee: Union Carbide Corp., Danbury, Conn.

[21] Appl. No.: 614,800

[22] Filed: May 29, 1984

[51] Int. Cl.[4] .......................... C08K 3/26; C08K 3/08
[52] U.S. Cl. .................................. 523/458; 523/457; 523/459; 523/466; 524/413; 524/417; 524/425; 524/431; 524/439; 524/440; 524/451; 524/539; 524/541
[58] Field of Search ............... 523/458; 524/440, 441, 524/413, 417, 425, 431, 430, 509, 539, 541; 525/481, 442, 501.5

[56] References Cited

U.S. PATENT DOCUMENTS

| | | |
|---|---|---|
| 1,873,945 | 8/1932 | Kraenzlein et al. |
| 2,198,939 | 4/1940 | Hempel ..................... 91/70 |
| 2,230,266 | 2/1941 | Rosenblum ............... 260/51 |
| 2,288,533 | 6/1942 | Kreidl et al. ............. 260/57 |
| 2,533,911 | 12/1950 | Bates ....................... 260/19 |
| 3,123,582 | 3/1964 | Tryzna ..................... 525/481 |
| 3,177,090 | 4/1965 | Bayes et al. .............. 525/481 |
| 3,373,077 | 3/1968 | O'Connell ................ 161/198 |
| 3,537,879 | 11/1970 | Wilson ..................... 117/49 |
| 3,737,410 | 6/1973 | Mueller ................... 260/59 |
| 3,944,712 | 3/1976 | Karez ...................... 428/418 |
| 4,025,490 | 5/1977 | Weaver .................... 260/53 R |
| 4,165,102 | 8/1979 | Bodmer ................... 282/27.5 |
| 4,165,103 | 8/1979 | Bodmer . |
| 4,216,299 | 8/1980 | Kikuga . |
| 4,216,300 | 8/1980 | Kikuga . |
| 4,363,892 | 12/1982 | Shain ....................... 525/442 |
| 4,370,382 | 1/1983 | Salensky .................. 525/481 |

FOREIGN PATENT DOCUMENTS 765318  11/1978  U.S.S.R. .

Primary Examiner—Lewis T. Jacobs
Attorney, Agent, or Firm—Jean B. Mauro

[57] ABSTRACT

Divalent metal complexes of novolacs act as modifiers for alkyds, drying oils, epoxy esters, epoxy resins and thermoplastic polyhydroxyethers. Lamellar, non-lamellar and spherical pigments improve corrosion and salt spray resistance of coatings made from these compositions.

15 Claims, No Drawings

METAL-CONTAINING PHENOLIC COATING COMPOSITIONS

BACKGROUND OF THE INVENTION

This invention pertains to corrosion inhibiting coating compositions and more particularly to metal complexed phenolic compositions having low volatiles content for high solids coatings.

BACKGROUND ART

Recent trends to high build maintenance coatings have resulted in a need for modifiers to improve the drying properties of high solids alkyds and increase their corrosion resistance. Alkyds have poor hydrolytic stability in adverse environments and generally require the addition of corrosion inhibitive pigments, such as lead or chromium compounds, to minimize their breakdown. The newer alkyd coatings are being accepted as single application systems particularly for the refinishing of railroad cars.

The formulation of coatings for steel requires a balance of pigment type and concentration in order to obtain the desired corrosion resistance, weathering properties, flexibility, and blister resistance. As the pigment concentration is increased, the porosity of the coating increases until the critical pigment volume concentration is reached, at which point porosity is high and corrosion or salt spray resistance is poor. The relationship is non-linear and depends on the pigment shape, size and dispersion. In general, however, low pigment volume concentrations give good corrosion resistance.

Blister resistance is improved as the pigment concentration is increased. The increased porosity of the coating allows moisture and hydrogen generated at the interface to escape. At low pigment concentrations, hydrogen is trapped and results in blister generation. The presence of a corrosion inhibitive ingredient which passivates the steel surface minimizes the gas generation and reduces blistering. Therefore, coating formulation is a compromise which is guided by the type of environment to which the coating will be exposed. Most primers are formulated in the range of 35 to 40% Pigment Volume Concentration (PVC) range. These do not make good high solids coatings because of excessive viscosity.

It is an object of this invention to provide high solids primer coating compositions having good corrosion resistance.

It is a further object of this invention to obtain necessary salt spray performance without employing toxic chromates.

Other objects will become apparent to those skilled in the art on a further reading of the specification.

SUMMARY OF THE INVENTION

Coating compositions expressed on a solvent free basis, meeting the above objects have been found comprising:

(A) an organic binder consisting essentially of:

(1) about 4 to about 40 volume percent of a divalent metal complex of a para-substituted novolac phenol-aldehyde condensation products, and (2) about 60 to about 96 volume percent of an organic coating material selected from the group consisting of alkyd resins, epoxy ester resins, drying oils, epoxy resins and thermoplastic polyhydroxyethers; and (B) based on the total coating composition, a pigment selected from the group consisting of about 7 to about 15 volume percent of aluminum-bronze lamellar pigments, about 20 to about 40 volume percent of a non-lamellar pigment selected from the groups consisting of talc, zinc phosphate, calcium carbonate, titanium dioxide, manganese oxide, and iron oxides or about 50 to about 65 volume percent of particulate zinc metal.

Solvents are preferably incorporated into the above composition to reduce viscosity for ease of application. Solvent levels used depend upon the organic binder. Suitable solvents include aromatics, such as xylenes, toluene, trimethyl benzene, diethyl benzene and the like; ketones, such as methyl isobutyl ketone, methyl ethyl ketone, and the like; glycol ethers, such as ethylene glycol monoethyl ether, and the like; esters, such as butyl acetate and the like. These solvents may be blended with each other or alcohols such as butyl alcohol, isopropyl alcohol and the like.

The preferred divalent metals used in (1) to prepare the divalent metal complexes of this invention are nickel, zinc and manganese.

Alkyd resins are described in the Encyclopedia of Polymer Science and Technology, Vol. 1 pages 663–730 Interscience Publishers NYC (1964) incorporated herein by reference. The term "alkyd" tends to specify polyester products composed of polyhydric alcohols, polybasic acids, and monobasic fatty acids.

The preferred alkyd resins used in this invention are those designated in the industry as high solids alkyd resins. These have total solids of 80% by weight or more.

Exemplary high solids alkyd resins include: Aroplaz 6440-A4-85, Cargill 5707, 5713 and 5811, medium to short oil alkyds dissolved in aromatic solvents, such as Cargill 5262 and Beckosol 12-038, Reichold 11-070 medium oil alkyd, and the like.

Exemplary drying oils include tung oil, linseed oil, oiticica oil, dehydrated castor oil, soybean oil, tall oil, fish oils, mixtures thereof and the like.

Epoxy ester resins useful in this invention are prepared by the esterification of a diglycidyl ether of bisphenol A with drying oil fatty acids. These preferably are made from oligomeric diglycidyl ethers of bisphenol A having an epoxy equivalent weight of about 450 to about 1000 grams per gram equivalent of epoxide. Examples available commercially are Cargill 7851 and Reichold Epotuf 38-411 or 38-403.

The term "thermoplastic polyhydroxyether" herein refers to substantially linear polymers having the general formula:

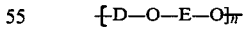

$$\{D-O-E-O\}_n$$

wherein D is the radical residuum of a dihydric phenol, E is a hydroxyl containing radical residuum of an epoxide and n represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced Viscosity} = \frac{t_s - t_o}{c t_o}$$

wherein $t_o$ is the efflux time of the solvent (tetrahydrofuran, $t_s$ is the efflux time of the poly(hydroxyether) solution, c is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear phenol such as those having the general formula:

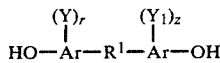

wherein Ar is an aromatic divalent hydrocarbon such as naphthylene and, preferably, phenylene, Y and $Y_1$ which can be the same or different are alkyl radicals, preferably having from 1 to 4 carbon atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example

—O—, —S—, —SO—, —SO$_2$—, and —S—S—, and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group of a sulfur containing group such as sulfoxide, and the like.

Examples of specific dihydric polynuclear phenols include among others:

The bis(hydroxyphenyl)alkenes such as 2,2-bis(4-hydroxyphenol)propane, 2,4'-dihydroxydiphenylmethane, bis(2-hydroxyphenyl)methane, bis(4-hydroxyphenyl)methane, bis(4-hydroxy-2,6-dimethyl-3-methoxyphenyl)methane, 1,1-bis(4-hydroxyphenyl ethane, 1,2,bis(4-hydroxyphenyl)ethane, 1,1-bis(4-hydroxy-2-chlorophenyl)ethane, 1,1-bis(3-methyl-4-hydroxyphenyl)ethane, 1,3-bis(3-methyl-4-hydroxyphenyl)propane, 2,2-bis(3-phenyl-4-hydroxyphenyl)propane, 2,2-bis(3-isopropyl-4-hydroxyphenyl)propane, 2,2-bis(2-isopropyl-4-hydroxyphenyl)propane, 2,2-bis(4-hydroxylnaphthyl)propane, 2,2-bis(4-hydroxyphenyl)pentane, 3,3-bis(4-hydroxyphenyl)pentane, 2,2-bis(4-hydroxyphenyl)heptane, bis(4-hydroxyphenyl)phenylmethane, 1,2-bis(4-hydroxyphenyl-1,2-bis(phenyl)propane, 2,2-bis(4-hydroxyphenyl)1-phenyl-propane and the like;

(Di(hydroxyphenyl)sulfones such as bis(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like;

Di(hydroxyphenyl)ethers such as bis(4-hydroxyphenyl)ether, the 4,3'-, 4,2'-, 2,2'-, 2,3'-, dihydroxydiphenyl ethers, 4,4'-dihydroxy-2,6-dimethyldiphenyl ether, bis(4-hydroxy-3-isobutylphenyl)ether, bis(4-hydroxy-3-isopropylphenyl)ether, bis(4-hydroxy-3-chlorophenyl)ether, bis(4-hydroxy-3-fluorophenyl)ether, bis(4-hydroxy-bromophenyl)ether, bis(4-hydroxynaphthyl)ether, bis(4-hydroxy-3-chloronaphthylether, bis(2-hydroxydiphenyl)ether, 4,4'-dihydroxy-2,6-dimethoxydiphenyl ether, 4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bisphenol reaction products of dipentene or its isomers and phenols such as 1,2-bis(p-hydroxyphenyl)-1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

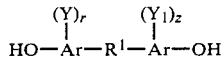

wherein Y and $Y_1$ are are previously defined, r and z have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be monoepoxide of diepoxide. By "epoxide" is meant a compound containing an oxirane group, i.e., oxygen bonded to two vicinal aliphatic carbon atoms, thus,

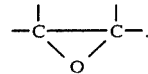

A monoepoxide contains one such oxirante group and provides a radical residuum E containing two hydroxy groups. Saturated epoxides, by which term is means diepoxides free of ethylenic unsaturation, i.e. $>C=C<$ and acetylenic unsaturation, i.e. $-C\equiv C-$, are preferred. Particularly preferred are halogen substituted saturated monoepoxides, i.e., the epihalohydrins and saturated diepoxides, which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbony oxygen

carbonyl oxygen

and the like.

Specific examples of monoepoxides include epichlorohydrins such as epichlorohydrin, epibromohydrin, 1,2-epoxy-1-methyl-3-chloropropane, 2,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexyl-methyl)adipate, bis(3,4-epoxycyclohexyl-methyl)phthalate, 6-methyl-3,4-epoxycyclohexylmethyl-6-methyl-3,4-epoxycyclohexane carboxylate, 2-chloro-3,4-epoxycyclohexylmethyl-2-chloro-3,4-epoxycyclohexane-carboxylate, diglycidyl ether, bis(2,3-epoxycyclopentyl)ether, 1,5-pentanediol bis(4-methyl-3,4-epoxycyclohexylmethyl)ether, bis(2,3-epoxy-2-ethylhexyl)adipate, diglycidyl maleate, diglycidyl phthalate, 3-oxatetracyclo[4.4.0.1$^{7,10}$.0$^{2,4}$]-undec-8-yl 2,3-epoxypropyl ether, bis(2,3-epoxycyclopentyl)sulfone, bis(3,4-epoxyhexoxypropyl)sulfone, 2,2'-sulfonyldiethyl, bis(2,3-epoxycyclopentanecarboxylate), 3-oxatetracyclo[4.4.0.1$^{7,10}$.0$^{2,4}$]-undec-8-61 2,3-epoxybutyrate, 4-pentenal-di-(6-methyl-3,4-epoxycyclohexylmethyl)acetal, ethylene glycol bis(9,10-epoxystearate), diglycidyl carbonate, bis(2,3-epoxybutylpenyl)-2-ethylhexyl phosphate, diepoxydioxane, butadiene dioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides having the grouping

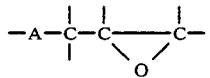

wherein A is an electron donating substituent such as
—O—,

—N—,
|
Q

—S—, —SO—, —SO$_2$—,

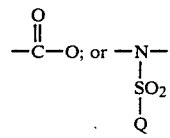

and Q is a saturated hydrocarbon radical such as an alkyl, cycloalkyl, aryl or aralkyl radical.

The preferred polyhydroxyether is available commercially as Bakelite Phenoxy PKHH, a trade designation of Union Carbide Corporation for condensation polymer derived from Bisphenol-A (2,2-bis(p-hydroxyphenyl)propane and epichlorohydrin having the structural formula:

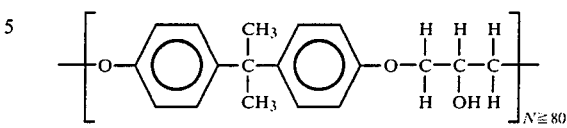

The phenoxy resin is available as a solution in glycol esters such as Cellosolve acetate (the acetate of a monoalkyl glycol ether sold under the Trademark Cellosolve by Union Carbide Corporation) or in pellet form which is readily soluble in a variety of solvents and solvent blends. The solid phenoxy resin sold under the designation PKHH by Union Carbide Corporation is soluble in the following solvents: butyl Carbitol, butyl Carbitol acetate, butyl Cellosolve, Carbitol solvent, Cellosolve solvent, diacetone alcohol, diethyl Carbitol, dimethylformamide, dimethyl sulfoxide, dioxane, ethoxy triglycol, mesityl oxide, methyl Cellosolve acetate, methyl ethyl ketone, and tetrahydrofuran.

Carbitol is a Trademark of Union Carbide Corporation for the monoalkyl ether of diethylene glycol.

Epoxy resins are commercially available from Shell Oil Company. Their preparation from bisphenol A and epoxychlorohydrin is described in U.S. Pat. No. 3,177,090, issued to R. E. Bayes et al.

Novolac resins produced by the reaction of a para substituted phenol with formaldehyde typically by heating one mole of p-tertiary butyl phenol with about 0.5–0.9 moles of formaldehyde in an acidic media. When less than 6.5 moles of formaldehyde are used per 7 moles of phenol the products are permanently fusible and soluble.

In a typical synthesis novolacs are prepared by heating 1 mole of an alkyl phenol with 0.5–0.9 moles of formaldehyde under acidic conditions. The temperature at which the reaction is conducted is generally from about 25° to about 175° C.

The preferred novolac resins are those based on p-t-butyl phenol modified with a dihydric polynuclear phenol, such as bisphenol A (also known as 2,2-bis(p-hydroxyphenyl)propane. Other alkyl phenols which can be used include: phenol, amyl phenol, octyl phenol, nonylphenol, dodecyl phenol, and the like.

A preferred resin is one derived from an 80:20 mixture by weight.

Other dihydric polynuclear phenols which can be used as the minor phenolic component of the novolac resins include:

The bis(hydroxyphenyl)alkanes such as
2,2-bis(4-hydroxyphenol)propane,
2,4'-dihydroxydiphenylmethane,
bis(2-hydroxyphenyl)methane,
bis(4-hydroxy-phenyl)methane,
bis(4-hydroxy-2,6-dimethyl-3-methoxyphenyl)methane,
1,1-bis(4-hydroxyphenyl)ethane,
1,2-bis(4-hydroxyphenyl)-ethane,
1,1-bis(4-hydroxy-2-chlorophenyl)ethane, 1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxylnaphthyl)propane,
2,2-bis(4-hydroxyphenyl)pentane, 3,3-bis(4-hydroxyphenyl)pentane,
2,2-bis(4-hydroxy-phenyl)heptane,
bis(4-hydroxyphenyl)phenylmethane,
bis(4-hydroxyphenyl)cyclohexylmethane,
1,2-bis(4-hydroxy-phenyl-1,2-bis(phenyl)propane,
2,2-bis(4-hydroxyphenyl)-1-phenyl-propane and the like.

Suitable solvents include aromatic organic compounds such as: benzene, xylene, toluene, dimethyl benzene, trimethyl benzene which may be blended with alcohols such as n-butyl alcohol, n-propyl alcohol, isopropyl alcohol, and the like.

| GLOSSARY OF MATERIALS USED | |
|---|---|
| Phenolic Resin A. - 100% phenolic-oil soluble - non-heat reactive resin derived from p-t-butyl phenol and Bisphenol A having a softening point of 195–235° F. (91–113° C.). | |
| Phenolic Resin B - Phenolic Resin A complexed with zinc oxide - benzoic acid mixture (4% Zn). | |
| Zirco - 6% | Interstab Chemicals, Inc. |
| 325 Mesh Water Ground Mica | The English Mica Company |
| Cobalt Naphthenate, 6% | Interstab Chemicals, Inc. |
| Calcium Naphthenate, 5% | Interstab Chemicals, Inc. |
| Manganese Naphthenate, 6% | Interstab Chemicals, Inc. |
| Aluminum Powder MD-5100 | Alcan Metal Powders Division of Alcan Aluminum Corporation. |
| Methanol | Article of Commerce |
| ASA (Methyl Ethyl Ketoxime) | Interstab Chemicals, Inc. |
| Antiskinning agent | Interstab Chemicals, Inc. |
| Aromatic 100 | Exxon Chemical |
| Tung Oil | Article of Commerce |
| Mineral Spirits | Article of Commerce |
| Bentone 27 | N. L. Industries |
| Titanium Dioxide R-960 | DuPont |

| TEST 1 SALT SPRAY (ASTM B-117) EXPOSURE RATING FOR COATINGS |
|---|
| Corrosion (ASTM D-610) |
| 10 — No Change |
| 9 — Very Slight Change |
| 8 — Slight Change |
| 7 — Medium + |
| 6 — Medium |
| 5 — Medium − |
| 4 — Slightly Bad |
| 3 — Bad |
| 2 — Very Bad |
| 1 — Partial Failure |
| 0 — Failure |
| T-1 = Rusting without blisters |
| T-2 = Rusting with blisters |
| Blisters (ASTM D-714) |
| F = Few |
| M = Medium |
| D = Dense |

Number refers to size of blisters.

The Mettler method for determining resin softening point is a hot stage method wherein the temperature at which the resin softens is noted. The apparatus is made by Mettler Instruments A.G. Switzerland.

The particulate zinc metal used in this invention is preferably finally divided zinc dust having a particle size of about 2 to about 15 microns. Such a grade of zinc is commercially available from the Federated Metals Corporation as L-15. These particles are roughly spherical.

The invention is further described in the examples which follow. All parts and percentages are by weight unless otherwise specified.

EXAMPLE 1

Preparation of Resin A

To a jacketed 2 liter resin kettle fitted with a stirrer, thermometer, reflux condenser with water trap and inlet tube, there was charged:

| p-tert.Butyl Phenol | 1109 g |
|---|---|
| Bisphenol-A | 277 g |
| Toluene | 83 g |
| Oxalic Acid | 8 g |
| Dow Corning Paint Additive #3* | 0.2 g |

*All materials were commercial grade. Dow Corning Paint Additive #3 is an alkyl polysiloxane dissolved in toluene at 10% solids.

The mixture was heated to 120° C. Over a three hour period, there was added 375 g of 50% aqueous formaldehyde at 120° C. (±2° C.). Water was continuously removed via the trap by azeotropic reflux.

The trap was removed and the reaction mix was then stripped of excess monomer and solvent to 160° C. under 27–28" Hg vacuum. The water trap was replaced.

The residue remaining in the resin kettle is resin A. This is used as an intermediate to make resin B.

EXAMPLE 2

Preparation of Resin B

After cooling to 130° C., there was metered into the resin kettle containing resin A in Example 1, a premixed solution (shown below) over a two-hour period with continuous water removal again while maintaining a temperature of 130° C. (±4° C.).

| PREMIX | |
|---|---|
| Zinc Oxide | 65.8 g |
| 28% Aqueous Ammonia | 257.0 g |
| Benzoic Acid | 258.0 g |

After all of the above mixture was added, the water trap was removed and the reaction mix was again stripped of unreacted material and water to a temperature of 155° C. under 25" Hg vacuum. The material was discharged molten, cooled in a sheet form and then broken into flakes. The product Resin B, contained 0.052% insolubles (10% solution of resin in toluene) and exhibited a color of 4–5 on the Gardner scale (50% solution of resin in toluene).

EXAMPLE 3

Evaluation of Resin A and Resin B

Table A compares the corrosion inhibitor efficiency of a p-t-butyl phenolic Resin A with Resin B. The data is from an accelerated test procedure using a model compound to simulate a coating under salt spray attack. (cf. G Salensky "Corrosion Inhibitor Test Method," Corrosion Control by Organic Coatings, H. Liedheiser, Jr. Editor, NACE, 1981) A value of 1.0 is complete inhibition, whereas 0.0 indicates no protection. Resin B shows superior inhibitive properties when 0.5% of it or resin A or the other compounds in Table A are dissolved in the model compound, diphenyl ether, and subjected to the test referenced above.

Resin B has a Mettler softening point of 190°–220° F.-(88°–104° C.) and is soluble in aromatics, alcohols, ketones, esters or blends of these solvents. It has poor solubility in aliphatic solvents. Resin B can be incorporated into a paint binder system by room temperature blending or "cold cutting" with solvents and other resins, such as, high solids alkyd resins, medium to short oil alkyds, epoxy esters, epoxy resins and thermoplastic polyhydroxyether resins.

Generally the binder solids are replaced with 5 to 35% of Resin B. A level of 20% gives good results with high solids alkyds.

An aluminum pigmented high solids alkyd coating was prepared according to the formulation shown in Table 1. Resin B, alkyd resin, and blend of methyl isobutyl ketone was mixed until complete solution was obtained. This was checked by dipping a glass slide into the mixture, air drying to release the solvent, and making sure that film is free of resin particles. An alternate, but slower procedure, is to dissolve Resin B in the proper proportion to produce a 50% solids solution in the solvent blend which is then added to the high solids alkyd. When solution has been achieved, the aluminum powder is dispersed using a high speed mixer. The coating is then cut back with additional alkyd resin, driers, and antiskinning agent.

A control coating not containing Resin B but having the same resin content was made as a control for comparative testing. The formulation shown in Table 1 has 20% of its binder solids as Resin B. The viscosity of the control coating was 22.5 seconds whereas this coating was 21 seconds.

The effect of Resin B on drying properties after eight days is shown in Table 2. Sward Rocker hardness tests were made on 2 mil dry film thickness (DFT) on cold rolled steel "Q" panels. Resin B coatings are 75% harder after an eight day air-drying period.

These same coatings were applied to sandblasted hot-rolled steel to 3.3 mils dried film thickness (DFT), air dried for a minimum of one week and exposed to salt spray (ASTM B-117).

Corrosion and blistering were rated from 10 to 0 by ASTM D-610 and ASTM D-714, respectively. Resin B coating had a corrosion rating of 8 versus 4 for the control after 1235 hours (Table 3). Salt spray resistance decreased when coating thicknesses were reduced to 1.9 mils DFT. Resin B coating was still superior to the control. Both coatings were stripped after a salt spray exposure of 760 hours and the steel substrates examined. Steel under the Resin B coating was a sandblasted metallic gray color, whereas the control panel was coated with black iron oxide of corrosion (Table 4). A zinc chromate primer (TTP-645A) was applied to sandblasted steel and exposed to salt spray for comparison purposes (Table 5). The zinc chromate primer was superior in corrosion and blister resistance to the control in Table 3 but inferior to the Resin B coating. It should be noted that the TTP-645A primer specifies a long oil alkyd, whereas the Aroplaz 6440-A4-85 resin is proprietary. On the basis of the above information, the Resin B modified aluminum coating should provide a suitable one-coat system for applications such as railroad cars, etc.

Similar improvements in corrosion resistance were obtained when the high solids alkyd was replaced with air drying short oil alkyd (Beckosol 12-038) or an epoxy ester (Epotuf 38-403).

Aluminum pigmented tung oil varnishes were also found to have good corrosion resistance when formulated with Resin B as the hard resin. See Table 6. Corrosion resistance was superior to a similar coating based on a phenolic varnish. Formulation is given in Table 7.

Resin B may also be used with corrosion inhibitive pigment to enhance corrosion resistance. The salt spray resistance of a Resin B modified high solids alkyd primer containing zinc molybdate (Molywhite 101) inhibitive pigment is shown in Table 8. Substitution of 20% of the alkyd solids with Resin B results in a 30% improvement in salt spray resistance after 1500 hours exposure compared to the control. The primer formulation is given in Table 9.

TABLE A

| | CORROSION INHIBITOR EFFICIENCY |
|---|---|
| NONYL PHENOL | 0.05 |
| p-t-BUTYL PHENOL | −0.02 |
| RESIN A | 0.83 |
| RESIN B | 0.99 |

TABLE 1

ALUMINUM PIGMENTED HIGH SOLIDS ALKYD

| | PARTS BY WEIGHT |
|---|---|
| DISSOLVE | |
| AROPLAZ 6440-A4-85 | 30.1 |
| METHYL ISOBUTYL KETONE | 37.5 |
| TOLUENE | 37.5 |
| RESIN B | 16.9 |
| DISPERSE | |
| ALUMINUM POWDER MD-1500 | 21.1 |
| TREATED SILICA | 0.2 |
| CUTBACK | |
| AROPLAZ 6440-A4-85 | 49.4 |
| 6% COBALT NAPHTHENATE | 0.7 |
| 5% CALCIUM NAPHTHENATE | 1.4 |
| 6% ZIRCONIUM NAPHTHENATE | 2.1 |
| METHYL ISOBUTYL KETONE | 0.3 |
| METHYL ISOBUTYL KETONE | 2.5 |
| VISCOSITY - FORD CUP #4 | 21 SECS |

TABLE 2

ALUMINUM PIGMENTED HIGH SOLIDS ALKYD

| RESIN B | 0% | 20% |
|---|---|---|
| SWARD ROCKER HARDNESS - 8 DAY | 16.0 | 28.0 |

TABLE 3

RESIN B MODIFIED HIGH SOLIDS ALKYD[A] · ALUMINUM COATING[B]

| SALT SPRAY EXPOSURE | CONTROL | RESIN B |
|---|---|---|
| CORROSION - 1000 HRS. | 6 | 9 |
| - 1235 HRS. | 4 | 8 |
| BLISTERS - 1000 HRS. | 2MD | 2-4F |
| - 1235 HRS. | 2MD | 2M |

[A]20% OF BINDER
[B]3.3 DFT SANDBLASTED STEEL

TABLE 4

RESIN B MODIFIED HIGH SOLIDS ALKYD[A] ALUMINUM COATING[B]

| SALT SPRAY EXPOSURE | CONTROL | RESIN B |
|---|---|---|
| CORROSION - 500 HRS. | 5 | 7 |

TABLE 4-continued
RESIN B MODIFIED HIGH SOLIDS ALKYD[A] ALUMINUM COATING[B]

| SALT SPRAY EXPOSURE | CONTROL | RESIN B |
|---|---|---|
| - 760 HRS. | 3 | 7 |
| BLISTERS - 500 HRS. | 2MD | 2-4M |
| - 760 HRS. | 2D | 2MD |
| SUBSTRATE CONDITION[B] | BLACK | METALLIC GRAY |

[A]20% OF BINDER
[B]COATING REMOVED AFTER 760 HRS. 1.9 DFT SANDBLASTED STEEL

TABLE 5
CORROSION RESISTANCE OF ZINC CHROMATE PRIMER TTP-645A
SALT SPRAY EXPOSURE

| CORROSION - 480 HRS. | 8 |
|---|---|
| - 1000 HRS. | 6 |
| - 1240 HRS. | 5 |
| BLISTERS - 480 HRS. | 2-4F |
| - 1000 HRS. | 2-4M |
| - 1240 HRS. | 2-4M |

SANDBLASTED STEEL - 3.8 MILS DFT

TABLE 6
ALUMINUM PIGMENTED TUNG OIL VARNISHES COLD ROLLED STEEL

|  | PHENOLIC | RESIN B |
|---|---|---|
| HARDNESS - 48 HRS. | 2B | 2B |
| - 168 HRS. | F | HB |
| DFT - MILS | 1.5 | 1.5 |
| CORROSION - 500 HRS. | 9 | 9 |
| - 740 HRS. | 4 | 7 |
| - 1015 HRS. | 2 | 6 |

TABLE 7
ALUMINUM PIGMENTED TUNG OIL VARNISH

|  | PARTS BY WEIGHT |
|---|---|
| TUNG OIL | 61.0 |
| AROMATIC SOLVENT 100 | 33.3 |
| RESIN B | 39.0 |
| 6% COBALT NAPHTHENATE | 1.0 |
| ANTISKINNING AGENT | 0.3 |
| ALUMINUM POWDER (MD-5100) | 38.2 |

TABLE 8
RESIN B MODIFIED HIGH SOLIDS ALKYD[B] PRIMER[A]

| SALT SPRAY EXPOSURE[C] | CONTROL | RESIN B |
|---|---|---|
| CORROSION - 1000 HRS. | 8 | 9 |
| - 1500 HRS. | 6 | 8 |

[A]MOLYWHITE PIGMENTED (ZINC MOLYBDATE)
[B]20% OF BINDER
[C]3.7 MILS DFT SANDBLASTED STEEL

TABLE 9
RESIN B MODIFIED HIGH SOLIDS ALKYD PRIMER

|  | PARTS BY WEIGHT |
|---|---|
| BALL MILL |  |
| MOLY-WHITE 101[a] | 80 |
| TITANIUM DIOXIDE R-960[b] | 150 |
| TALC CP-14-35[c] | 175 |
| 325 W. G. MICA[d] | 75 |
| QUSO-WR-50[e] | 2.5 |
| AROPLAZ 6440-A4-85 | 120.5 |

TABLE 9-continued
RESIN B MODIFIED HIGH SOLIDS ALKYD PRIMER

|  | PARTS BY WEIGHT |
|---|---|
| METHYL ISOBUTYL KETONE | 232.4 |
| RESIN B (50% IN MIBK) | 135.2 |
| CUT BACK |  |
| AROPLAZ 6440-A4-85 | 197.6 |
| 6% COBALT | 2.8 |
| 5% CALCIUM | 5.6 |
| 6% ZIRCONIUM | 8.5 |
| ANTISKINNING AGENT | 1.0 |
| MIBK | 10.0 |
| GRIND | 6.5 |
| VISCOSITY | 65 SECS |
| PVC | 30% |

[a]Zinc Molybdate - Sherwin Williams
[b]DuPont
[c]Pfizer
[d]The English Mica Company
[e]Philadelphia Quartz

TABLE 10
RESIN B MODIFIED HIGH SOLIDS ALKYD WITH MANGANESE OXIDE SALT SPRAY RESISTANCE

|  | 1000 HRS. | |
|---|---|---|
|  | CORROSION | BLISTERS |
| CONTROL | 5 | 2D |
| 20% RESIN B | 7 | 2F |

3.7 DFT SANDBLASTED STEEL

TABLE 11
RESIN B MODIFIED HIGH SOLIDS ALKYD PRIMER WITH MANGANESE OXIDE

|  | PARTS BY WEIGHT |
|---|---|
| BALL MILL |  |
| MANGANESE OXIDE M-34[a] | 272 |
| TALC CP-14-35 | 165 |
| 325 MESH W G MICA | 75 |
| QUSO WR-50 | 2.5 |
| AROPLAZ 6440-A4-85 | 120.5 |
| METHYL ISOBUTYL KETONE | 232.4 |
| RESIN B (50% IN MIBK) | 135.2 |
| CUT BACK |  |
| AROPLAZ 6440-A4-85 | 197.6 |
| 6% COBALT DRIER | 2.8 |
| 5% CALCIUM DRIER | 5.6 |
| 6% ZIRCONIUM DRIER | 8.5 |
| ANTISKINNING AGENT | 1.0 |
| MIBK | 10.0 |
| GRIND | 6.5 |
| VISCOSITY | 65 SECS |
| PVC | 30% |

[a]Elkem Metals Company

TABLE 12
EFFECT OF RESIN B ON CORROSION RESISTANCE OF EPOXY[B] COATINGS[A]

| SALT SPRAY | CONTROL | BUSAN | PAC-40[B] |
|---|---|---|---|
|  | CORROSION RATING | | |
| 2000 HRS. | 7 | 6 | 8 |
| 3000 HRS. | 5 | 6 | 7 |
|  | BLISTERS | | |
| 2000 HRS. | 2-4M | 2M | 2F |
| 3000 HRS. | 2MD | 2MD | 2M |

[A]SANDBLASTED STEEL - 4.0 MILS DFT
[B]5% ON BINDER

TABLE 13
EPOXY RESIN COATING

| PART A | | | |
|---|---|---|---|
| VERSAMID 115 (70%) | 49.8 | 49.8 | 49.8 |
| LECITHIN | .4 | .4 | .4 |
| SILICA | 16.1 | — | 16.1 |
| BUSAN 11[b] | — | 20.0 | — |
| TALC | 27.0 | 27.0 | 27.0 |
| TiO$_2$ | 36.0 | 36.0 | 36.0 |
| XYLENE | 26.8 | 26.8 | 26.8 |
| MIBK | 10.0 | 10.0 | 10.0 |
| RESIN B | — | — | 4.4 (5.0%) |
| PART B | | | |
| EPON 1001 (75%)[c] | 60.2 | 60.2 | 60.2 |
| MIBK | 15.5 | 15.5 | 15.5 |
| SWARD HARDNESS AFTER 1 WEEK | 50 | 64 | 70 |

[a]Polyamide epoxy curing agent from General Mills, Inc.
[b]Buckman Laboratories
[c]Solid bisphenol A epoxy resin available from Shell Chemical Company

TABLE 14
ZINC-RICH PHENOXY COATING

| PHENOXY PKHH[A] | 215.20 |
|---|---|
| TREATED SILICA | 6.0 |
| MPA 60[B] | 20.0 |
| CALCIUM OXIDE | 3.3 |
| ZINC PIGMENT L-15[C] | 676.0 |

[A]25% IN CELLOSOLVE ACETATE (Thermoplastic polyhydroxyether)
[B]N. L. Industries-Suspending agent
[C]Federated Metals Corporation Manganese oxide, Pigment M-34 from Elkem Metals Co., has been introduced as a replacement for iron oxide in primers where it is reported to give better corrosion resistance at equivalent costs. When RESIN B is used to modify a high solids alkyd primer based on M-34, improved corrosion and blister resistance is obtained compared to the control (Table 10). The primer formulation is shown in Table 11.

Polyamide hardened epoxy coatings find application in the protection of chemical equipment and structural steel in adverse environments where alkyds are not sufficiently protective. Busan (barium meta borate pigment) has been used to impart additional corrosion resistance without the hazards of lead or chromium pigments. It was found that modification of the polyamide epoxy systems with 5% Resin B provides protection equivalent or better than the Busan system or control. Improvements for corrosion and blister resistance are seen in Table 12 for RESIN B modified coatings applied to sandblasted steel. The formulations tested are provided in Table 13.

Resin B offers advantages as a modifier for high solids alkyds in improved drying properties and increased salt spray resistance.

TABLE 15

| ZINC-RICH PHENOXY COATING ON COLD ROLLED STEEL SALT SPRAY RESISTANCE | | |
|---|---|---|
| | 1500 HRS. | |
| | CORROSION | BLISTER |
| CONTROL | 4 | 4D |
| 20% RESIN B | 6 | 6M |

CRS STEEL 0.7 MILS DPT

Zinc Rich Thermoplastic Polyhydroxyether Coatings

Resin B was substituted for 20% of the phenoxy resin in a zinc rich system similar to the one being employed in automotive applications. The basic unmodified control formulation is given in Table 14. Both coatings were applied to cold-rolled steel and baked Dacromat coated panels. Curing schedule was 500° F. (260° C.) peak metal temperature requiring a 90-second total cure time. Coating thickness was 0.7 mils DFT. The Resin B provided improved corrosion and blister resistance after 1500 hours salt spray exposure (Table 15).

EXAMPLE 4

A coating formulation with zinc metal was formulated by mixing the components listed below:

| Aroplaz 6440-A4-85 | 29.6 g. |
|---|---|
| Resin B | 12.6 g. |
| Silane Treated Silica | 1.7 g. |
| Suspending Agent MPA-60X (N. L. Industries) | 1.5 g. |
| Zinc Pigment L-15 Federated Metals Corp. | 315.0 g. |
| Methyl Isobutyl Ketone | 11.3 g. |
| Toluene | 10.3 g. |
| Cobalt Naphthenate (6%) | 0.26 g. |
| Calcium Naphthenate (5%) | 0.52 g. |
| Zirconium Naphthenate (6%) | 0.78 g. |
| Methylethyl Ketoxime | 0.1 g. |

This formulation was sprayed onto a sand blasted panel which was dried to a dry film thickness (DFT) of 2.5 mils. A salt spray corrosion rating of 7 was obtained after 1000 hours of exposure.

The resin B content of this formulation represents 20 weight percent of the organic binder on a solvent free basis.

EXAMPLE 5

Preparation of a higher (4.8%) Zinc Modified Phenolic Resin

To a 2 liter resin kettle fitted with a heating mantle, thermometer, stirrer, distilling condenser and liquid inlet, there was charged 504 g of phenolic resin A (see previous example I) and 110.9 g of toluene. The mixture was heated to 130° C. while distilling off the toluene. A premixed solution was then prepared from 35.5 g of zinc oxide, 106.2 g of concentrated ammonium hydroxide (28% NH$_3$), 79.8 g of benzoic acid and 37.5 g of neodecanoic acid. The premixed solution was then added to the resin at 130° C. over a period of two hours while continuously distilling off the water and ammonia. The reaction mixture was then heated to 145° C. at 25 inches of mercury vacuum. The molten resin was poured into a pan and cooled. The solid resin was 99.6% soluble in a 1/1 mixture of toluene/ethylene glycol monoethyl ether at 10% solids. The softening point of the resin was 215° F. (Mettler method).

EXAMPLE 6

Preparation of a Manganese Modified Phenolic Resin

To a 3 liter resin kettle fitted with a heating mantle, stirrer, thermometer, reflux condenser and liquid inlet, there was charged 1109 g of t-butyl phenol, 277 g of bisphenol-A, 83 g of toluene, 8 g of oxalic acid and 8 drops of an antifoam agent. The mixture was heated to 120° C. and then 375 g of 50% aqueous formaldehyde was metered in over three hours and five minutes. The water was continuously removed via a Dean-Stark trap while maintaining a 120° C. temperature. After all the formaldehyde was added, the reaction mix was vacuum stripped to 160° C. at a reduced pressure of 26 inches of mercury. The resin was poured into a pan and cooled and was labeled resin A.

To a 2 liter resin kettle fitted as above, 300 g of the above solid resin (Resin A) was charged along with 60 g of toluene. The mixture was heated to 130° C. while removing the toluene by distilling it off. A premixed solution was then prepared from 53.5 g of manganese acetate tetrahydrate, 168.1 g of concentrated ammonium hydroxide (28% $NH_3$) and 85 g of benzoic acid. This solution was added to the resin at 130° C. while water and ammonia was continuously removed over a period of two hours. The reaction mixture was then heated to 145° C. under a vacuum of 25 inches of mercury. The molten resin was then discharged to a pan and cooled. The resin was 96.2% soluble in a mixture of 1/1 toluene-ethylene glycol monoethyl ether at a concentration of 10% solids. The softening point of the resin was 213° F. (100° C.) (Mettler method).

Although the invention has been described in its preferred forms with a certain amount of particularity, it will be understood by those skilled in the art that the present disclosure has been made only by way of Example and that numerous changes can be made without departing from the spirit and scope of the invention.

We claim:

1. Coating composition expressed on a solvent free basis comprising:
    (A) an organic binder consisting essentially of:
        (1) about 4 to about 40 volume percent of a divalent metal complex of a para-substituted novolac phenol-aldehyde condensation product;
        (2) about 60 to about 96 volume percent product of an organic coating material selected from the group consisting of alkyd resins, drying oils, epoxy resins and thermoplastic polyhydroxyethers; and
    (B) based on the total coating composition, a pigment selected from the group consisting essentially of (i) aluminum-bronze lamellar pigments at a pigment volume concentration of about 7 to about 15 volume percent, (ii) about 20 to about 40 volume percent of a non-lamellar pigment selected from the group consisting of talc, titanium dioxide, zinc phosphate, calcium carbonate, manganese oxide and iron oxide, and (iii) about 50 to about 65 volume percent of particulate zinc metal.

2. Composition of claim 1 wherein the divalent metal is zinc.

3. Composition of claim 1 wherein the divalent metal is nickel.

4. Composition of claim 1 wherein the divalent metal is manganese.

5. Composition of claim 1 containing an aluminum bronze lamellar pigment, at a Pigment Volume Concentration of about 7 to about 15%.

6. Composition of claim 1 containing non-lamellar pigments at a Pigment Volume Concentration of 20-40%.

7. Composition of claim 1 wherein the organic coating material is a drying oil.

8. Composition of claim 7 wherein the drying oil is tung oil.

9. Composition of claim 7 wherein the drying oil is linseed oil.

10. Composition of claim 1 wherein the phenol of the novolac phenol-aldehyde condensation product is a 80:20 mixture by weight of t-butyl phenol and 2,2-bis(p-hydroxyphenyl)propane.

11. Composition of claim 1 wherein the organic coating material is an alkyd resin.

12. Composition of claim 1 wherein the organic coating material is a thermosetting epoxy resin.

13. Composition of claim 12 wherein the epoxy resin is derived from bisphenol A.

14. Composition of claim 1 wherein the organic coating material is a thermoplastic polyhydroxyether.

15. Composition of claim 14 containing zinc pigment at a Pigment Volume Concentration of 50-65%.

* * * * *

UNITED STATES PATENT AND TRADEMARK OFFICE
CERTIFICATE OF CORRECTION

PATENT NO. : 4,544,688

DATED : October 1, 1985

INVENTOR(S) : George Anthony Salensky et al

It is certified that error appears in the above-identified patent and that said Letters Patent is hereby corrected as shown below:

At column 11, line 6, under Resin B, the numeral "7" should read --5--.

Signed and Sealed this

Twenty-fourth Day of December 1985

[SEAL]

Attest:

DONALD J. QUIGG

*Attesting Officer*      *Commissioner of Patents and Trademarks*